(12) United States Patent
Jiang et al.

(10) Patent No.: US 11,288,830 B2
(45) Date of Patent: Mar. 29, 2022

(54) REPRESENTATION LEARNING-BASED STAR IDENTIFICATION METHOD

(71) Applicant: Beihang University, Beijing (CN)

(72) Inventors: Jie Jiang, Beijing (CN); Likai Xu, Beijing (CN)

(73) Assignee: Beihang University, Beijing (CN)

( * ) Notice: Subject to any disclaimer, the term of this patent is extended or adjusted under 35 U.S.C. 154(b) by 14 days.

(21) Appl. No.: 15/929,255

(22) Filed: Apr. 8, 2020

(65) Prior Publication Data

US 2020/0380712 A1   Dec. 3, 2020

(30) Foreign Application Priority Data

May 28, 2019 (CN) .......................... 201910450340.7

(51) Int. Cl.
| G06K 9/62 | (2006.01) |
| G06N 3/08 | (2006.01) |
| G01C 21/02 | (2006.01) |
| G01C 21/20 | (2006.01) |
| G01C 21/24 | (2006.01) |
| G06F 17/18 | (2006.01) |
| G06T 7/70 | (2017.01) |
| G06N 3/04 | (2006.01) |

(52) U.S. Cl.
CPC ................ *G06T 7/70* (2017.01); *G06F 17/18* (2013.01); *G06N 3/0454* (2013.01); *G06N 3/0472* (2013.01); *G01C 21/025* (2013.01); *G06T 2207/20076* (2013.01); *G06T 2207/20081* (2013.01); *G06T 2207/20084* (2013.01)

(58) Field of Classification Search
CPC ............. G06T 7/70; G06T 2207/20076; G06T 2207/20081; G06T 2207/20084; G06F 17/18; G06N 3/0454; G06N 3/0472; G06N 3/088; G01C 21/025; G06K 9/0063; G06K 9/6256

See application file for complete search history.

(56) References Cited

U.S. PATENT DOCUMENTS

| 2006/0145052 A1* | 7/2006 | Potteck ................. B64G 1/361 |
| | | 250/203.1 |
| 2012/0212608 A1* | 8/2012 | Yoon .................... G06K 9/6211 |
| | | 348/135 |
| 2020/0189770 A1* | 6/2020 | Lemke ................... H02S 30/20 |

OTHER PUBLICATIONS

Kim et al., "Reliable Star Pattern Identification Technique by Using Neural Networks," 2004, Journal of the Astronautical Sciences, vol. 52, pp. 239-249. (Year: 2004).*

* cited by examiner

*Primary Examiner* — John W Lee
(74) *Attorney, Agent, or Firm* — Oppedahl Patent Law Firm LLC (57) ABSTRACT

Disclosed in the present disclosure is a representation learning-based star identification method, which utilizes an end-to-end and representation learning based neural network model RPNet, for fast, efficient, and robust full-sky star identification tasks. The RPNet learns a unique star pattern for each star from a huge amount of random simulated star image samples, then a classification is made on these star patterns learned before. The RPNet comprises two parts: (1) a star pattern generator (SPG) based on a star pattern generation network to generate unique star patterns for the star image samples; (2) a star pattern classifier (SPC) to classify the unique star patterns generated on the front end. And a weight search verification algorithm is also proposed in the invention for filtering and verification of main stars of the GRSs identified by the RPNet, which further improves tremendously the identification ability for a single star image.

4 Claims, 6 Drawing Sheets

REPRESENTATION LEARNING-BASED STAR IDENTIFICATION METHOD

CROSS-REFERENCE TO RELATED APPLICATION

The present application is filed based upon and claims priority to Chinese Patent Application No. 201910450340.7, filed on May 28, 2019, the contents of which are hereby incorporated by reference in its entirety.

TECHNICAL FIELD

The present disclosure relates to the field of star identification, more particularly, to a representation learning-based star identification method.

BACKGROUND

The navigation system is an indispensable part of a spacecraft and includes attitude determination, positioning, speed measurement and so on. The star sensor is an important device in the navigation system that can determine its three-axis attitude without any prior information with high accuracy, which makes it widely used in various kinds of aircrafts, such as airplanes, rockets and satellites. The star sensor has two operating modes: the initial attitude acquiring mode and tracking mode. Though most of the time it works on tracking mode, a full-sky star identification process is needed for a star sensor to obtain current attitude of the spacecraft once it loses in space. Star identification algorithms aim at finding the correlation between observed and cataloged stars. It mainly falls into two categories: the subgraph isomorphism-based algorithms and the pattern-based identification algorithms.

The subgraph isomorphism-based algorithms borrow ideas from graph theory: stars are treated as vertexes, angular distances between star pairs are considered as the weight of the edge. A complete graph is formed from the cataloged stars and a subgraph is constructed from the observed stars. Thus, identification problems can be reduced to find the best matching subgraph in the complete graph. The triangle algorithm is the most typical and widely used one, it uses three stars and their angular distances between each other to generate a triangle feature, the algorithm is quite robust when there are only few stars, even though three stars, but it is time-consuming because a huge number of triangle features formed in a star catalog have to be searched and matched. Pattern-based star identification algorithms construct a unique pattern for each guiding reference star (GRS), this pattern of a GRS (the main star) usually contains information from its guiding neighbor stars (GNSs). The identification process for the pattern is to find the most similar pattern among all of the pre-created patterns. The most representative pattern-based algorithm is the grid algorithm proposed by Padgett, it has a remarkable tolerance for position noise, but once the nearest neighbor star is missing or wrongly detected, the pattern created and the identification would be incorrect.

With the boom of artificial intelligence, neural networks and some advanced algorithms such as genetic algorithms were applied on star identification, however, the complicated network structure and insufficient robustness of these algorithms resulted in lower identification rates and slower identification speed. Therefore, the present disclosure proposes a representation learning based star identification network RPNet whose network structure is simple but highly efficient, the RPNet utilizes a star pattern generator (SPG) to generate star patterns for the GRS, then a star pattern classifier (SPC) is applied for the identification of the pattern generated previously. Finally, a weight searching strategy is exerted to improve the identification rate. By learning from a huge amount of data, the pattern generated by RPNet is pretty robust to position noise, star magnitude noise, and false stars. It outperforms other pattern-based algorithms and AI algorithms on average. Meanwhile, this algorithm is also far lower than other searching-based algorithms in terms of time complexity. The proposed algorithm behaves well in real star images too.

SUMMARY

Embodiments of the present disclosure provide a representation learning-based star identification method, which is intended to solve problems as follows.

(1) For star position noise and star magnitude noise, traditional star identification algorithms generally have disadvantages such as long identification time, low identification rate, and poor robustness.

(2) The traditional star identification algorithms cannot meet the requirements of high accuracy and high efficiency simultaneously. For example, the triangle algorithm has high identification rate but long identification time, and the grid algorithm has fast identification speed but unsatisfactory identification rate.

(3) The traditional algorithms have poor robustness to false stars and missing stars, so it cannot cope with complicated noise conditions.

(4) The traditional algorithms cannot utilize the parallelism of FPGAs, which thus limits the attitude update rate.

The technical solutions according to the embodiments of the present disclosure are directed to a representation learning-based star identification method, including following steps (1) to (5).

In step (1), screening an original star catalog to obtain guiding reference stars (GRSs) available for identification by a star identification network (RPNet).

In step (2), constricting an initial input for the RPNet according to the GRS and its guiding neighbor stars (GNSs).

In step (3), constructing an end-to-end and representation learning based neural network model RPNet for fast, efficient, and robust full-sky star identification tasks, where the RPNet learns a unique star pattern for each star from a huge amount of random simulated star image samples, then a classification is made on these star patterns learned before, where the RPNet includes two parts: 1) a star pattern generator (SPG) based on a star pattern generation network to generate unique star patterns for the star image samples; 2) a star pattern classifier (SPC) to classify the unique star patterns generated on the front end.

In step (4), utilizing a weight searching verification algorithm for filtering and verification of main stars of the GRSs identified by the RPNet.

In step (5), inputting real star images, and outputting identification results.

According to an embodiment of the disclosure, the procedure for constructing the initial input for the RPNet includes: based on distributions between the GRS and its GNSs as well as between the GNSs, choosing in GNSs nearest to the GRS within a pattern radius, calculating angular distances between the GRS and the m GNSs and pair-wise angular distances of the m GNSs respectively, and concatenating the two groups of angular distances subjected to discretization to form a one-dimensional vector as the initial input of the RPNet.

According to an embodiment of the disclosure, the RPNet includes the SPG and the SPC, the SPG includes an encoder part of the pattern generation network, and the SPC includes a typical feed-forward neural network, the pattern generation network is adapted from a denoising auto encoder, and three key points of improvement are: (1) a new noise-adding strategy is adopted in the pattern generation network, compared with the traditional denoising auto encoder that adds noise to a discretized input, noises are added into clean simulated star images so as to construct the discretized noise input; (2) the pattern generation network forms a two-layer encoding-decoding structure by addition of a further full connection layer into a traditional encoder-decoder structure that has only one full connection layer; (3) the pattern generation network takes a sparse encoding strategy to map the initial input into a high-dimensional feature space, rather than dimensionality reduction of the initial input by the traditional denoising auto encoder.

According to an embodiment of the disclosure, training of the pattern generation network and the pattern classification network is divided into two stages, after finishing the training of the pattern generation network, the pattern classification network is trained according to star patterns and pattern labels generated by the trained pattern generation network.

According to an embodiment of the disclosure, in the weight searching verification algorithm, based on characteristics of RPNet outputting probability and different distances between the main stars and an image center, for each star image, three main stars nearest to the image center are chosen to form the initial input of the RPNet for identification; for each chosen main star, the RPNet outputs the probability that the chosen main star may belong to each star in the nSAO star catalog, then chooses three of the most likely stars as candidate stars for the GRS; a position weight and a probability weight are assigned to each candidate star, candidate star pairs in a field of view are calculated, and the GRS with higher confidence ratio is screened out by choosing a candidate star pair with a highest weight score, thereby improving the accuracy of star identification as a whole.

Compared with the prior art, the embodiments of the disclosure have advantages and beneficial effects as follows.

(1) The algorithm is quite robust towards small deformations and shifts of stars, and the star magnitude noise hardly affects the identification rate.

(2) The algorithm is fast in theory, its time complexity is only O(1), and its space complexity is not more than other algorithms;

(3) The architecture of the RPNet is relatively simple. After training on a computer, RPNet is feasible and easy to re-implement on embedded platforms such as FPGA (Field Programmable Gate Array) or DSP (Digital Signal Processor).

BRIEF DESCRIPTION OF DRAWINGS

FIG. 2A to FIG. 2D show the initial input construction of the RPNet. Specifically.

FIG. 4A to FIG. 4D show adding of different types of noises into the simulated star images. Specifically.

DETAILED DESCRIPTION

The invention is described in further detail with reference to the drawings and embodiments below.

Figure 1:
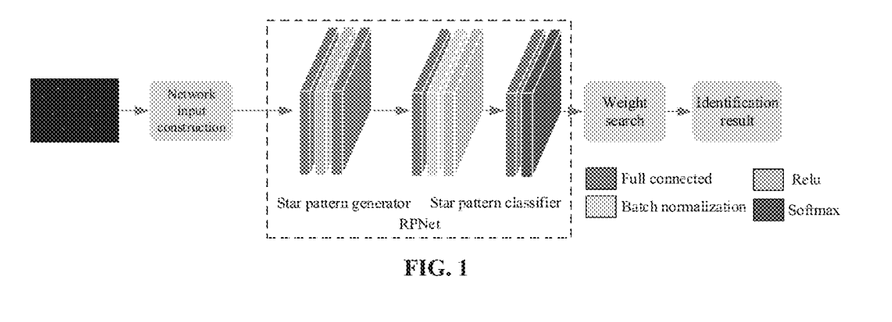
FIG. 1 is a principle block diagram of a representation learning-based star identification method according to the present disclosure.

The present disclosure proposes an end-to-end and representation learning based neural network model RPNet, for fast, efficient, and robust full-sky star identification tasks. The RPNet learns a unique star pattern R-Pattern for each star from a huge amount of random simulated star image samples, then a classification is made on these star patterns learned before. The RPNet includes two parts: (1) a star pattern generator (SPG) based on a star pattern generation network to generate unique star patterns for the star image samples; (2) a star pattern classifier (SPC) to classify the unique star patterns generated on the front end. And a weight searching verification algorithm is also proposed in the invention for filtering and verification of main stars of the GRSs identified by the RPNet, which further improves tremendously the identification ability for a single star image. The flow chart of the entire algorithm is shown in FIG. 1.

For the star identification, the size of the star catalog influences directly the efficiency and accuracy of the star identification. Thus a screening process for the original star catalog is imperative to obtain the GRSs that can be identified by the RPNet network. The Smithsonian Astrophysical Observatory Star Catalog (SAO) was chosen, a limiting magnitude that can be detected by a star sensor is set to 6.0 Mv, some stars in dense areas are deleted, one of the double stars whose angular distance between each other is too close is retained, and finally, only right ascension and declination, brightness of GRSs, etc. are kept. Through the filtering process above, a total of 5,045 GRSs are obtained, whose star indices are renumbered from 0 to 5,044, and the navigation star catalog formed by these GRSs is called the nSAO star catalog. The RPNet generates patterns of GRSs via the training of a pattern generation network, though it does not need to manually design the pattern in precision, the input still should contain sufficient information to guarantee the pattern generation network to produce a well discriminative unique pattern. So, it is quite critical to construct the input for the RPNet network according to the information of the GRS and its GNSs within the pattern radius.

Figure 2A:
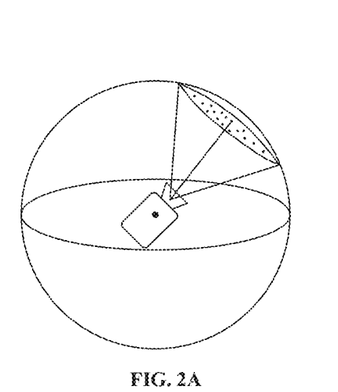
FIG. 2A shows S and its neighbor stars observed by a star sensor at a boresight pointing of ($\alpha_s$, $\beta_s$, $\phi_s$)
Figure 2B:
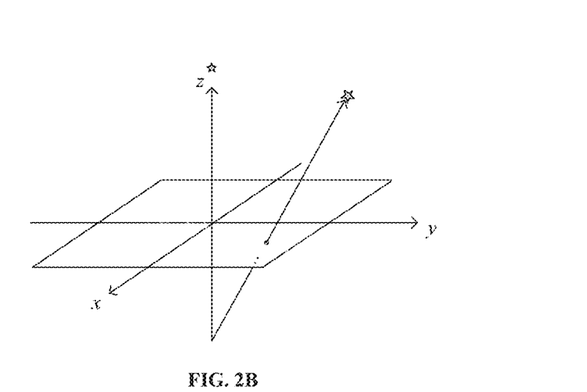
FIG. 2B shows projection of S and its neighbor stars onto coordinates of the image plane.
Figure 2C:
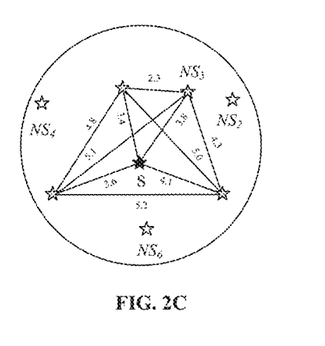
FIG. 2C shows calculation of angular distances between S and selected m stars, as well as pair-wise angular distances of the m selected stars.

Considering the fact that various types of noises are generated from the image level, the information of the GRS and GNSs is hence transformed from the celestial coordinate system into the image coordinate system of the star sensor. Assuming that the position of a GRS denoted by S in the celestial coordinate system is $(\alpha_s, \beta_s)$ (with $\alpha_s$ as right ascension and $\beta_s$ as declination), let the boresight pointing of the star sensor be $(\alpha_s, \beta_s, \phi_s)$, where $\phi_s$ is the roll angle whose value has no effect on the relative relationship between S and its GNSs, therefore it can be set to a random value in the range $[-2\pi, 2\pi]$. For another star N whose coordinates in the celestial coordinate system are $(\alpha_n, \beta_n)$, the imaging process on the photosensitive surface can be represented via:

$$s \begin{pmatrix} X_n \\ Y_n \\ 1 \end{pmatrix} = \begin{pmatrix} f & 0 & u_0 \\ 0 & f & v_0 \\ 0 & 0 & 1 \end{pmatrix} \cdot \begin{pmatrix} a_{11} & a_{12} & a_{13} \\ a_{21} & a_{22} & a_{23} \\ a_{31} & a_{32} & a_{33} \end{pmatrix} \cdot \begin{pmatrix} \cos\alpha_n \cos\beta_n \\ \sin\alpha_n \cos\beta_n \\ \sin\beta_n \end{pmatrix},$$

where s is the scale factor other than 0, $(X_n, Y_n)$ is the projected position of N in the image coordinate system, f is the optical focus, $(u_o, v_o)$ is the coordinates of the main point, and $a_{11}$~$a_{33}$ are elements of the transformation matrix from the celestial coordinate system into the image coordinate system of the star sensor. The angular distance $d_{sn}$ between S and N can be calculated from the image plane coordinates via:

$$d_{sn} = \arccos\left(\frac{v_s \cdot v_n}{\|v_s\| \cdot \|v_n\|}\right)$$

$$v_s = \frac{1}{\sqrt{X_n^2 + Y_n^2 + f^2}} \begin{pmatrix} X_n \\ Y_n \\ -f \end{pmatrix},$$

$$v_n = \frac{1}{\sqrt{X_n^2 + Y_n^2 + f^2}} \begin{pmatrix} X_n \\ Y_n \\ -f \end{pmatrix}$$

where N is considered the GNS of S when $d_{sn}$ is within the pattern radius p. After obtaining all GNSs of S, the initial input construction of the RPNet is shown in the following steps 1 to 4.

In step 1, choose the right ascension and declination of S and a random roll angle as the boresight pointing of the star sensor, project S and its neighboring stars GNSs into the image plane, calculate angular distances between S and its GNSs, and determine the GNSs of S that are within the range of pattern radius p.

In step 2, select m nearest GNSs within the pattern radius p, if the number of GNSs is smaller than m, select all of the GNSs; denote the angular distances between these selected GNSs and S by vector $d_{sm}$, and calculate the angular distances between these selected GNSs and denote them by vector $d_{nn}$.

Figure 2D:
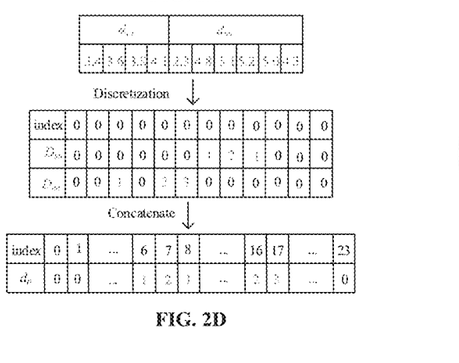
FIG. 2D is a schematic diagram of discretization (where for simplicity, parameters are set as $\rho=6°$, $e=0.5°$, $m=4$).

In step 3, discrete $d_{sm}$ and $d_{nn}$, wherein the discretization factors are e and 2e respectively, correspondingly the maximum angular distances in $d_{sn}$ and $d_{nn}$ are p and 2p; and the length of two discretized vectors $D_{sn}$ and $D_{nn}$ thus obtained are both $\lfloor p/e \rfloor$; for the element with angular distance $d_1$ from $d_{sn}$ and the element with angular distance $d_2$ from $d_{nn}$, the discretization process can be formulated by:

$$id_1 = d_1/e, D_{sn}[id_1] = D_{sn}[id_1] + 1$$

$$id_2 = d_2/2e, D_{nn}[id_2] = D_{nn}[id_2] + 1$$

In step 4, concatenate the $D_{sn}$ and $D_{nn}$ to form an one-dimensional vector as the initial input of the RPNet.

Figure 3:
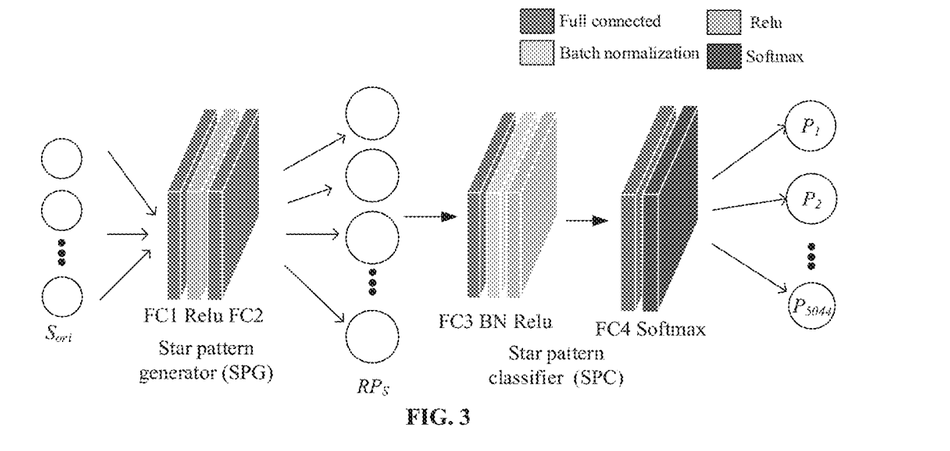
FIG. 3 shows the network structure of RPNet.

The RPNet is composed mainly of two modules: the front end is a SPG based on a pattern generation network; then a star pattern classification network formed by a feed-forward neural network. For the initial input $S_{ori}$ of a GRS as S, a unique pattern $RP_s$ is generated via the encoding of SPG to $S_{ori}$, then the star pattern classification network classifies this unique pattern to gain the probability of each star that S may belong to in the nSAO catalog. The entire structure of the RPNet is shown in FIG. 3.

The structures of the RPNet are as follows.

STAR PATTERN GENERATOR:

The SPG consists of two fully connected layers and a single activation function layer; it is the encoder part of a pattern generation network (PGN). The encoder part of a well-trained pattern generation network can encode a unique pattern for the initial input and map the input from the $2\lfloor P/e \rfloor$ dimension into N-dimensional pattern vector RPs. The high discriminative pattern it generates guarantees the simplicity of the subsequent SPC.

STAR PATTERN CLASSIFIER:

The network is based on the typical feed-forward neural network, and a batch normalization layer is added into this network to gain a more robust performance. And it is used to classify the star patterns generated by the star generation network.

The specific hierarchical structure of the RPNet is shown in Table 1:

TABLE 1

Architecture of the RPNet.

| Layer | Parameters |
| --- | --- |
| FC1 | Weight 400 × 512 |
| FC2 | Weight 512 × 1024 |
| FC3 | Weight 1024 × 512 |
| BN | Batch normalization, enables the input to allow a distribution of N(0, 1). |
| Relu | Activation function, enables the network to have nonlinearity. |
| FC4 | Weight 512 × 5045, maps into the space of the nSAO catalog. |
| Softmax | Normalize to a probability distribution. |

After the Softmax normalization process, the output of the RPNet obeys a probability distribution of $$\sigma(z)_j = \frac{e^{z_j}}{\sum_{k=1}^{K} e^{z_i}}, j = 1, 2, \ldots K,$$

where K denotes the size of the nSAO catalog and the output probability $p_j$ denotes the predicted probability of the j-th star in the nSAO catalog, which meets the demand $$\sum_{j=0}^{5044} p_j = 1.$$

Both the pattern generation network (PGN) and the pattern classification network (PCN) need to complete learning through training on adequate samples. The pattern generation network requires noise samples and clean samples for training, and the training of a pattern classification network requires patterns generated from a well-trained pattern generation network previously and their corresponding sample labels.

For a GRS named S, a simulated star image I without noise can be generated as described above, and the corresponding clean sample of S can be acquired directly by constructing initial input. For the pattern generation network, types and quantities of noise samples determine the performance of the unique patterns it generates. In theory, the more noise samples it consumes, the higher the accuracy of the identification, however, because they are limited by hardware condition and efficiency in practice, the number of simulation and the samples for training are ultimately limited, thus the noise types chosen and the number of noise samples generated are not infinite. Noise samples are generated by adding different types of noise into the image I, the types of noise and the way they are added are shown in FIGS. 4A to 4D.

The details of the generating procedure for the noise samples are described below.

Figure 4A:
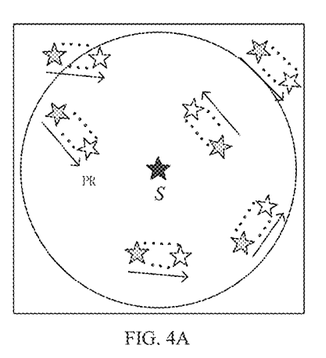
FIG. 4A shows adding of position noise into the simulated star image.

POSITION NOISE SAMPLES:

Position noise corresponds to shifts of stars in image. For all of stars except S in the simulated image I, Gaussian noises of mean of 0 and standard deviation of σx and σy are added into their X and Y coordinates, which is:

$$pn_x \sim N(0, \sigma_x^2), pn_y \sim N(0, \sigma_x^2;)$$

Since the simulated star image I is symmetrical, it is capable of setting σx=σy. The range of the standard deviation of noise is from 0.2 pixel to 1.6 pixels, at a step of 0.2 pixel, and ten noise samples are assigned for each level of position noise, thus 80 position noise samples of S are generated in total.

Figure 4B:
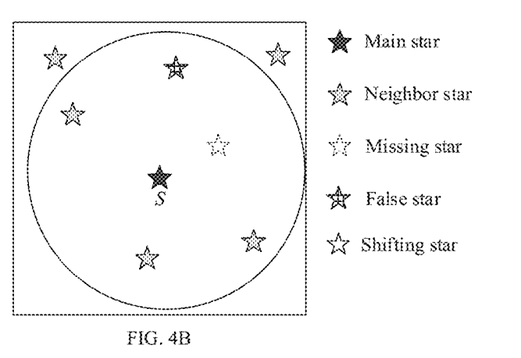
FIG. 4B shows adding of star magnitude noise into the simulated star image.

MAGNITUDE NOISE SAMPLES:

Magnitude noise leads to variations in a star's brightness in the image; for stars with magnitudes around the limited detectable magnitude of a sensor, magnitude noise may make it darker, causing it to disappear; or for stars that cannot be detected before, magnitude noise may brighten it to make it appear. Therefore, a 7.0 Mv limited detectable magnitude is set to gain a simulated star image I during the simulation, and magnitude noise is added into each star except S in the image I, then a 6.0 Mv limited detectable magnitude of a sensor is set as the threshold, to obtain S and the GNSs of S within the pattern radius. Star magnitude noise obeys Gaussian distribution of:

$$mn \sim N(0, \sigma^2), \sigma \in [0.323, 0.484, 0.646, 0.807, 0.969]$$

For each level of magnitude noise, 16 noise samples are generated, which adds up to 80 noise samples.

Figure 4C:
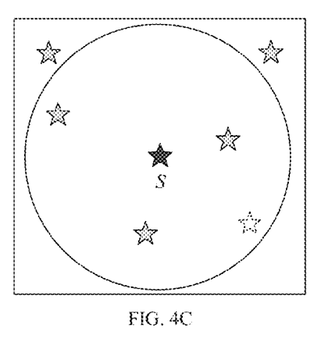
FIG. 4C shows adding of missing star noise into the simulated star image.

MISSING STAR SAMPLES:

Some stars that should have appeared disappear at random with a certain probability, because of optical system imaging noise or circuit noise. For stars except for S in the simulated image I, 1 to 5 stars are dropped randomly to produce 80 missing star samples of S in total.

Figure 4D:
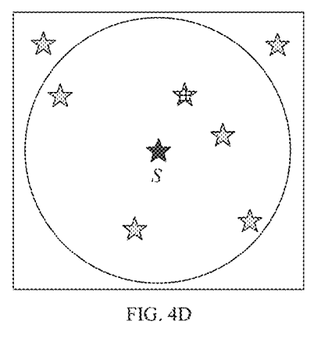
FIG. 4D shows adding of false star noise into the simulated star image.

FALSE STAR SAMPLES:

False stars may be formed by the planet, cosmic dust, background white noise, and even the flame from the tail of an aircraft. The algorithms of angular distance are allergic to false stars; however, the proposed algorithm has good resistance to false stars. The false stars are considered to be distributed uniformly within the image plane, thus one to five false stars are added randomly with a uniform magnitude from 0 Mv to 6 Mv into the area within the pattern radius of S to obtain 80 false star samples in total.

For a GRS, 320 noise samples versus one clean sample are generated. There are 5,045 GRSs in the nSAO catalog in total, therefore, the noise sample database ẍẌ contains 5,045*320=1,614,400 samples, and the corresponding labels ÿŸ of ẍẌ are indices of noise samples in the nSAO catalog. Similarly, the clean sample database X includes 5,045 samples in total, and the corresponding label set of X is y. The training dataset of RPNet is {Ẍ, ÿ; X, y}.

Figure 5:
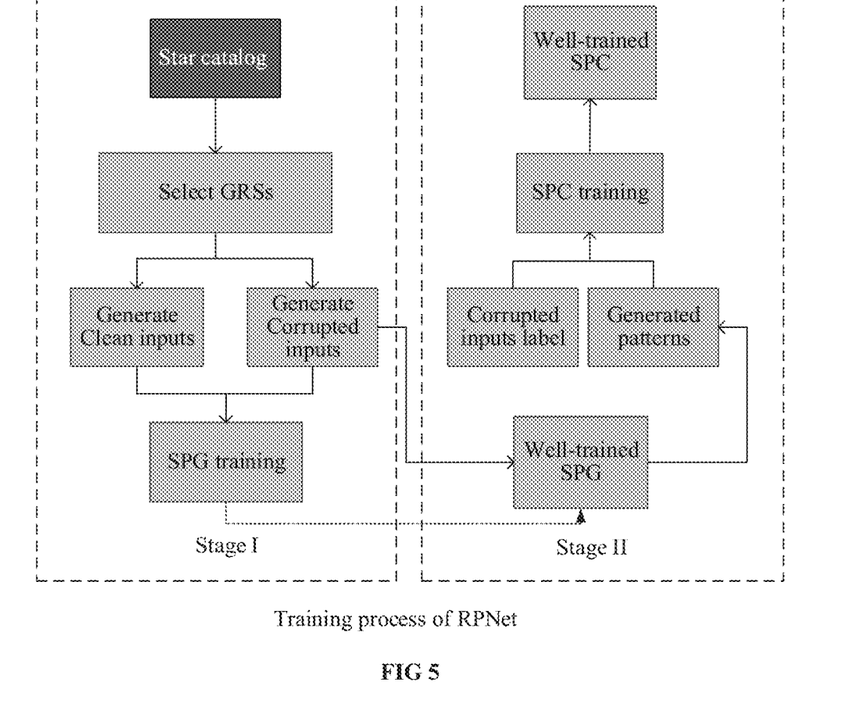
FIG. 5 is a block diagram showing a training process of the RPNet.

The training of the RPNet can be divided into two stages. In the first stage, the pattern generation network learns from noise and clean samples to gain a star pattern generator that can encode each sample. In the second stage, noise samples are fed into the previously trained star pattern generator to produce unique star patterns R-Pattern for the noise samples. Then, the R-Pattern are classified by a pattern classification network. A schematic block diagram of the RPNet training process is shown in FIG. 5.

Figure 6:
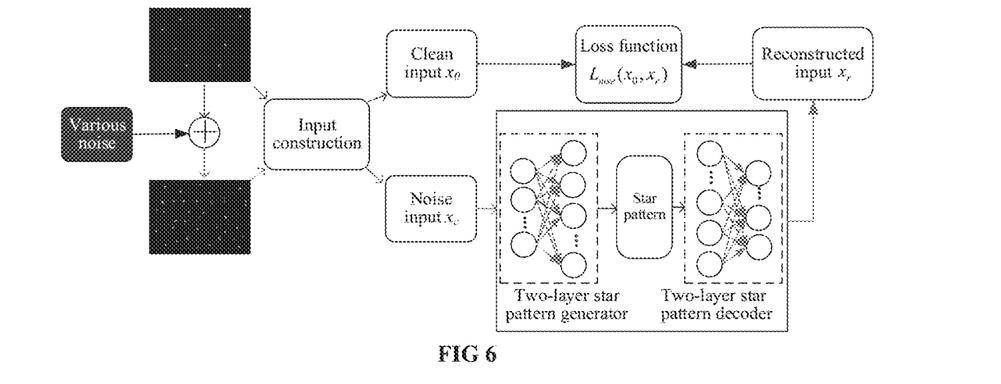
FIG. 6 shows an architecture of the pattern generation network and its training strategy.

The pattern generation network is based on the denoising auto encoder (DAE), which accepts corrupted noise samples as input and is trained to predict the initial uncorrupted data as output, and a hidden layer of the network can generate a code representing the input. The detailed architecture and training process of the pattern generation network are shown in FIG. 6.

Both the star pattern generator (SPG) and star pattern decoder (SPD) contain two fully connected layers, where the first fully connected layer is followed by a Relu activation function to perform nonlinearity. When creating the initial input of RPNet, the parameters are p=6°, e=0.03°, hence the input dimension of RPNet is 2⌊p/e⌋=400, the detailed parameters of each part of the pattern generation network are listed in Table 2 below.

TABLE 2

Parameters of each layer of pattern generation network.

| | Input | Layer1 | Layer2 | Output |
|---|---|---|---|---|
| SPG | (400,) | $W_1$: 400 × 512<br>$b_1$: 512 × 1 | $W_2$: 512 × 1024<br>$b_2$: 1024 × 1 | (1024,) |
| SPD | (1024,) | $W'_2$: 1024 × 512<br>$b'_2$: 512 × 1 | $W'_1$: 512 × 400<br>$b'_1$: 400 × 1 | (400,) |

The training of pattern generation network adopts MSE loss, which minimizes the mean-squared error of clean input $x_0$ and reconstructed input $x_r$:

$$L(x_0, x_r) = \|x - x_r\|2.$$

Star pattern classification network in the backend is trained by 10-fold cross-validation strategy to select the best hyper-parameters, and then all samples are then put into training, the loss function of this part is cross-entropy loss:

$$L(p, y_i) = -\log p_{yi}$$

where, $y_i$ is the label of the sample and $p_{yi}$ denotes the probability of the sample the network predicts belongs to $y_i$. The hyper-parameters of two components of RPNet are listed in Table 3 below.

TABLE 3

Hyper-parameters of RPNet training

| | Lr | Epoch | Batch size | L2 | Weight decay | Early Stop |
|---|---|---|---|---|---|---|
| PGN[1] | 0.0001 | 15 | 512 | 0.0001 | No | No |
| PCN[2] | 0.001 | 10 | 512 | 0.0001 | Yes | Yes |

Figure 7:
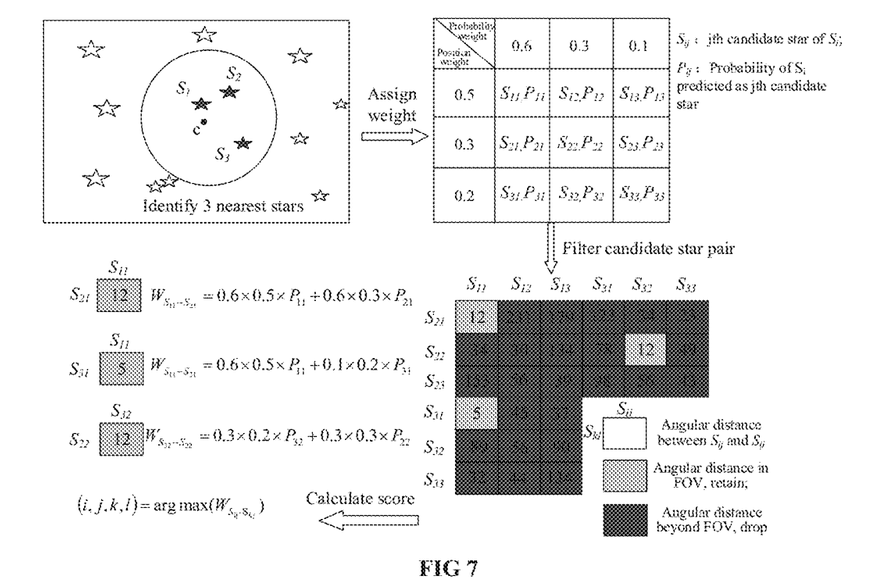
FIG. 7 is a schematic diagram of the weight search algorithm.

For pattern-based star identification algorithms, recognition of a single star image can be simplified to identify the GRS closest to the image center, because its pattern is the most complete which contains most GNSs within the pattern radius. Once the specific GRS is identified, its GNSs can be identified easily. However, the wrong identification of the GRS will result in the failure of the star image identification or it will take a huge amount of verification for trial and error, and then re-identify another GRS for recognition. Based on the characteristic of outputting probabilities of the neural network, three stars nearest to the image plane center are chosen, and according to their distances away from the center and the probabilities of their candidate stars to perform a weight searching verification, which increases tremendously the confidence ratio of the identified GRS and further improves the identification rate for GNSs in the pattern cluster. That is, the identification rate and processing efficiency for a single star image are increased significantly. The schematic diagram of the algorithm is shown in FIG. 7.

Suppose there are three stars closest to the image center c as $S_1$, $S_2$, and $S_3$, the distances meet the following relationship:

$$S_{1c} < S_{2c} < S_{3c}$$

The initial inputs constructed by $S_1$, $S_2$, and $S_3$ are fed into the RPNet for prediction, for these three stars, the RPNet will predict the probability of each star in the star catalog, then choose three of the most likely stars as candidate stars. Take $S_1$ for example: the corresponding probabilities of its candidate stars $S_{11}$, $S_{12}$, and $S_{13}$ outputted by RPNet are $p_{11}$, $p_{12}$, and $p_{13}$, respectively, which satisfy the following formula:

$$p_{11} > p_{12} > p_{13} > \ldots,$$

The position weights $po_1$, $po_2$ and $po_3$ are assigned to candidate stars based on the distance from the near to the far; and the probability weight $pr_1$, $pr_2$, and $pr_3$ are assigned to candidate stars based on the probabilities from the large to the small. Two groups of weights meet the following relationship:

$$\sum_{i=1}^{3} po_i = 1, \sum_{i=1}^{3} pr_i = 1.$$

Two stars are selected randomly from S1, S2, and S3, and then the candidate stars of these two stars are chosen randomly and denoted by $S_{ij}$ and $S_{kl}$, where i, j, k, l $\in$ {1,2,3} and i$\neq$k, the total number of candidate star pairs formed are $C_3^2 \cdot C_3^1 \cdot C_3^2 = 27$. Assume the ascension and declination of $S_{ij}$ and $S_{kl}$ are ($\alpha_1$, $\beta_1$) and ($\alpha_2$, $\beta_2$) in the star catalog respectively. The angular distance between two candidate stars are as follows:

$$d_{ijkl} = \arccos[\cos(\beta_1) \cdot \cos(\beta_2) \cdot \cos(\alpha_1 - \alpha_2) + \sin(\beta_1) \cdot \sin(\beta_2)].$$

If $d_{ijkl}$ is beyond the maximum angular distance of field of view (FOV), it indicates the chosen candidate star pair is wrong. Otherwise, calculate the score of the qualified candidate star pair based on the following equation:

$$W_{Sij \leftrightarrow Skl} = po_i \cdot pr_j \cdot p_{ij} + po_k \cdot pr_l \cdot p_{kl}.$$

Finally, the candidate star pair with the highest score is chosen as the most confident stars for GRSs, which is the basis for star identification. That is $$(S_{ij}, S_{lk}) = \arg \max(W_{Sij \leftrightarrow Skl})$$

Embodiments

Figure 8:
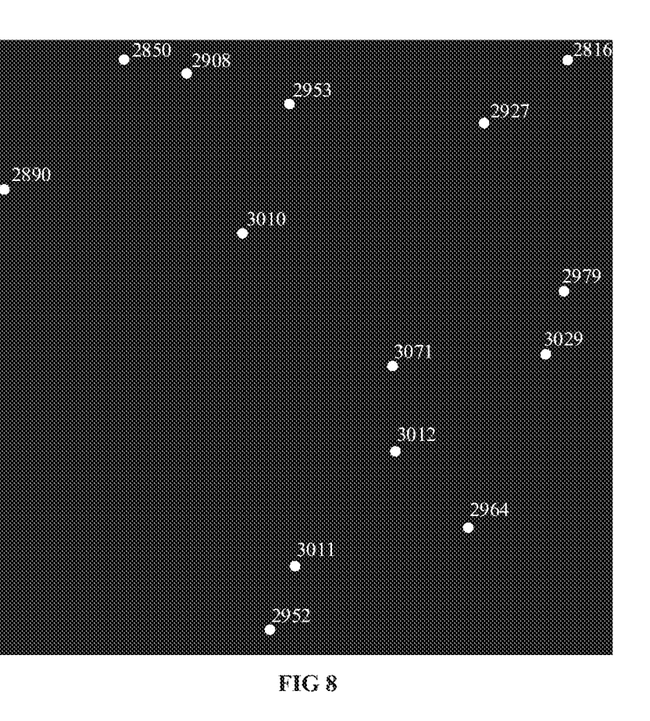
FIG. 8 shows identification results for a real star image.

The star identification method in the invention has a remarkable tolerance for position noise, star magnitude noise, false star and missing star. A total of 323 real star images downloaded from the Chinese civilian satellite ZY-3 are identified in the star image to verify the performance in a real scene. And only five images are failed to be identified because the stars in the star image are generally dark and the star centroids positioning algorithm is with low accuracy, resulting many stars in these images being too dim to be extracted. The present disclosure achieves a 98.45% identification rate. The recognition results of one real star image are shown in FIG. 8.

Figure 9:
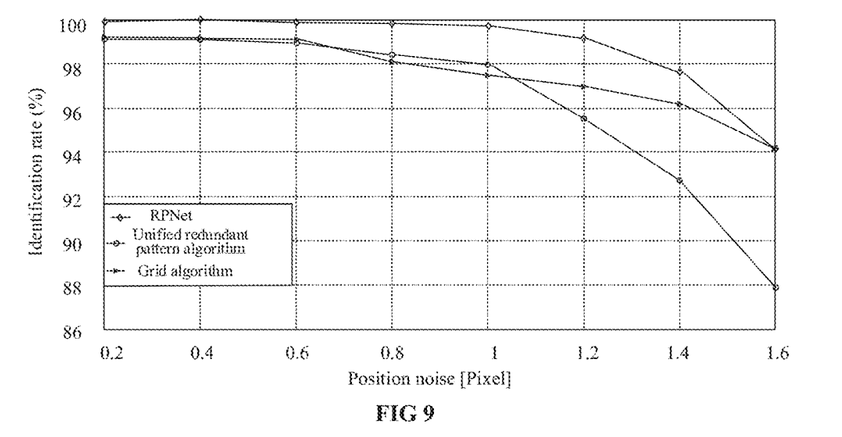
FIG. 9 shows identification rates, for different levels of position noise, of a representation learning-based star identification method according to the present disclosure.
Figure 10:
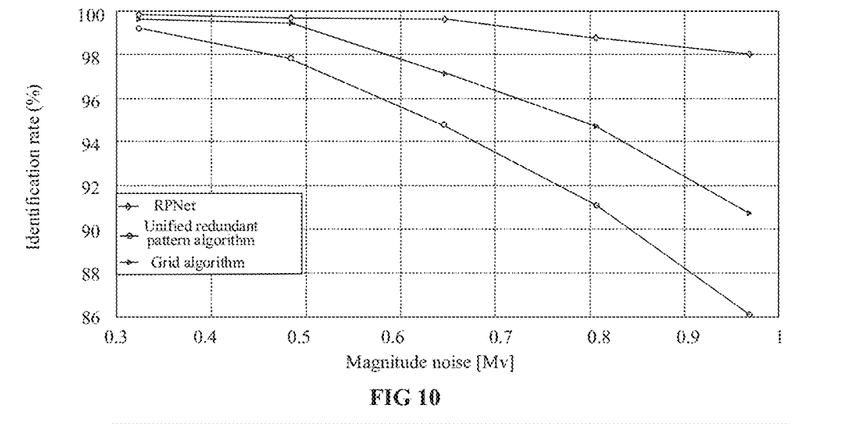
FIG. 10 shows identification rates, for different levels of star magnitude noise, of a representation learning-based star identification method according to the present disclosure.

In order to compare the performance of the present disclosure and the traditional method under the conditions of different noise, a series of simulation tests are performed on a PC, and the details of the test are as following:

(1) The performances of the algorithms towards different position noises. In the same way above for adding position noise, for each noise level with a mean of 0 and a standard deviation of 0.2 to 1.6 pixels, 10,000 simulated star images are generated randomly as a test data set. The performance of the algorithm in this test data set is shown in FIG. 9.

The identification rate of RPNet is obviously near 100% and almost has no attenuation when the standard deviation of noise is less than 1 pixel. By contrast, the identification rate of RPNet is steadily 1% higher than the other two algorithms, indicating that the RPNet has a considerable robust performance towards tiny deformation. When the position noise continues to increase, the unified redundant pattern algorithm has a cliff fall in identification rate, and the grid algorithm of identification rate also decreases, however, the identification rate of the RPNet is still beyond 94% when the position noise increases to 1.6 pixels, which still outperforms the other two algorithms.

(2) The performances of the algorithms towards different star magnitude noises. The distribution of the magnitude noise also obeys a Gaussian distribution with a mean from 0 and a standard deviation of $\sigma$, and for each level of magnitude noise with a standard deviation ranging from 0 to 1 Mv, 10000 noise images are produced as a test set.

The identification rate of the RPNet drops from 99.90% to merely 98.11% when the magnitude noise increases from 0.323 Mv to 0.969 Mv. By contrast, the unified redundant pattern algorithm undergoes a large decline from 99.29% to 86.17%, while the grid algorithm falls from 99.70% to 90.80% in the same noise condition. Both of algorithms are decreased severely when the noise is greater than 0.5 Mv, but the performance of the RPNet remains favorable. And the reasons for this huge gap between the RPNet and the other two algorithms may be their different way of generating patterns, the pattern generated doesn't involve any star magnitude information, but both of the other two algorithms use brightness information to some extent during the construction of patterns.

Figure 11:
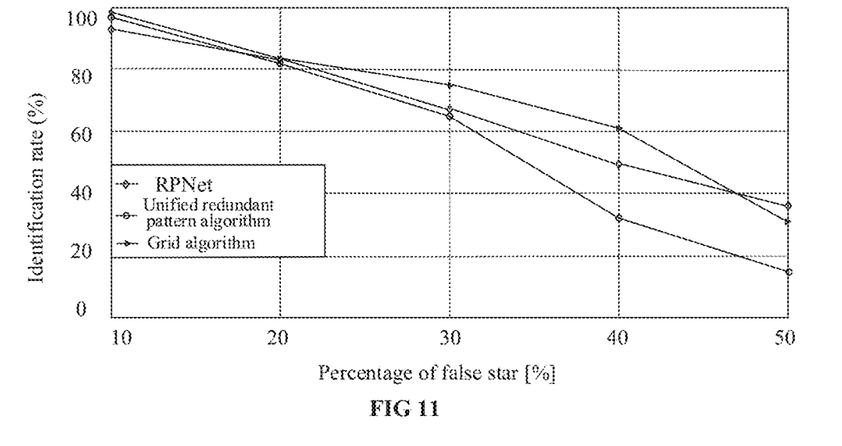
FIG. 11 shows identification rates for different ratios of false stars of a representation learning-based star identification method according to the present disclosure.

(3) The performances of the algorithms towards different number of the false stars. The coordinates of false stars X and Y are distributed uniformly within the image plane, that is X~U (0, Width), U (0, Height); and the magnitudes of false stars are distributed uniformly from 0 Mv to 6 Mv. The noise level of false stars is dependent on the percentage of false stars, for a randomly simulated star image without any noise, if the number of real star $N_r$ in the image is p, then the number of false star $N_f$ to be added can be calculated by:

$$\frac{N_f}{N_f + N_f} = p.$$

For each different percentage of false stars, 10,000 star images after adding false stars are produced as test set. The performances of the three algorithms are shown in FIG. 11.

The performance of the RPNet is the best when the percentage of false stars is relatively small (p<20%), where the identification rate remains higher than 80%. With the increase in the ratio p, the grid algorithm is slightly better than the RPNet, but there is little difference. However, when the ratio p reaches 50%, the RPNet outperforms the other two algorithms and with an identification rate over 35%.

Figure 12:
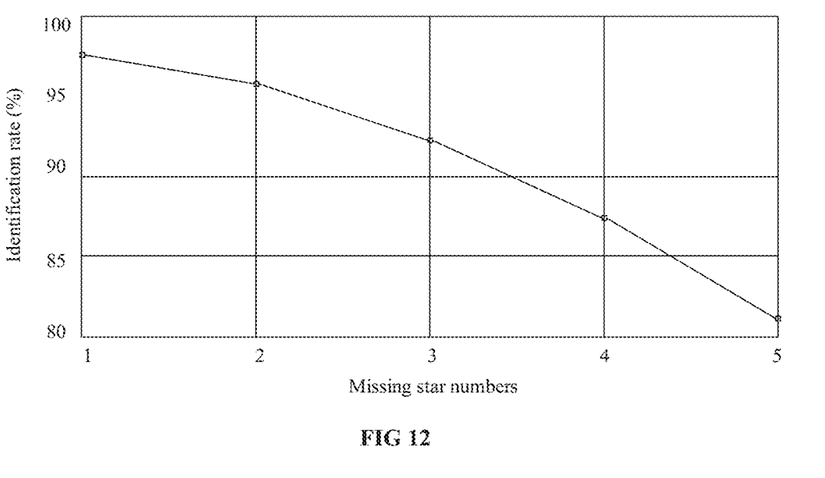
FIG. 12 shows identification rates, for different number of missing stars, of a representation learning-based star identification method of the present disclosure.

(4) The performances of the algorithms towards different number of the missing stars. Missing stars are not as common as the previous noises in the star images, and there is no experiment on the unified redundant pattern algorithm, therefore, only the performance of the
RPNet towards different number of the missing stars is shown in this invention, the each level of missing stars contains 10,000 simulated noise samples for one to five missing stars. The identification rate of the RPNet is shown in FIG. 12.

The star missing will cause the loss of information, and the pattern-based algorithms are generally difficult to cope with the star missing situations. The identification rate of the RPNet drops from 97.6% to 81.09% when the number of missing stars increases from 1 to 5.

When the number of missing stars is less than or equal to 2, the identification rate of RPNet decreases slightly, and the identification rate remains in an acceptable range; but when the number of missing stars is more than 2, the identification rate decreases rapidly, and the algorithm is no longer stable.

The invention claimed is:

1. A representation learning-based star identification method performed by a computing device, comprising:
    screening an original star catalog to obtain guiding reference stars (GRSs) available for identification by a star identification network (RPNet);
    constructing an initial input for the RPNet according to the GRS and its guiding neighbor stars (GNSs);
    constructing an end-to-end and representation learning based neural network model RPNet for fast, efficient, and robust full-sky star identification tasks, wherein the RPNet learns a unique star pattern for each star from a huge amount of random simulated star image samples, then a classification is made on these star patterns learned before, wherein the RPNet comprises two parts: a star pattern generator (SPG) based on a star pattern generation network to generate unique star patterns for the star image samples; and a star pattern classifier (SPC) to classify the unique star patterns generated on the front end;
    utilizing a weight searching verification algorithm for filtering and verification of the GRSs identified by the RPNet so as to improve identification rate for the GNSs; and
    inputting real star images into the RPNet, and outputting identification results by the RPNet,
    wherein in the weight searching verification algorithm, based on characteristics of RPNet outputting probability and different distances between the main stars and an image center, for each star image, three main stars nearest to the image center are chosen to form the initial input of the RPNet for identification; for each chosen main star, the RPNet outputs the probability that the chosen main star belongs to each star in an nSAO star catalog, then chooses three of the most likely stars as candidate stars for the GRS; a position weight and a probability weight are assigned to each candidate star, weight scores of candidate star pairs in a field of view are calculated according to the position weights and the probability weights of the candidate stars, and the GRS with higher confidence ratio is screened out, for star identification, by choosing a candidate star pair with a highest weight score, wherein the nSAO star catalog is obtained by a screening process performed on a Smithsonian Astrophysical Observatory (SAO) star catalog, and during the screening process, a limiting magnitude that can be detected by a star sensor is set to 6.0 Mv, stars in dense areas are deleted, one of double stars whose angular distance between each other is too close is retained, and only right ascension and declination and brightness of GRSs are kept.

2. The representation learning-based star identification method according to claim 1, wherein the procedure for constructing the initial input for the RPNet comprises: based on distributions between the GRS and its GNSs as well as between the GNSs, choosing a number of m GNSs nearest to the GRS within a pattern radius, calculating angular distances between the GRS and the m GNSs and pair-wise angular distances of the m GNSs respectively, and concatenating the two groups of angular distances subjected to discretization to form a one-dimensional vector as the initial input of the RPNet.

3. The representation learning-based star identification method according to claim 1, wherein the RPNet comprises the SPG and the SPC, wherein the SPG includes an encoder part of the pattern generation network, and the SPC includes a typical feed-forward neural network; and the pattern generation network is adapted from a denoising auto encoder by adding noise into clean simulated star images so as to construct the discretized noise input; adding a further full connection layer into a traditional encoder-decoder structure that has only one full connection layer, so that the pattern generation network forms a two-layer encoding-decoding structure; and using a sparse encoding strategy to map the initial input into a high-dimensional feature space.

4. The representation learning-based star identification method according to claim 1, wherein training of the pattern generation network and the pattern classification network is divided into two stages, after finishing the training of the pattern generation network, the pattern classification network is trained according to star patterns and pattern labels generated by the trained pattern generation network.

* * * * *